Aug. 9, 1966  U. MAKIRI  3,265,010
MASS TRANSPORTATION SYSTEM
Filed March 25, 1964  2 Sheets-Sheet 1
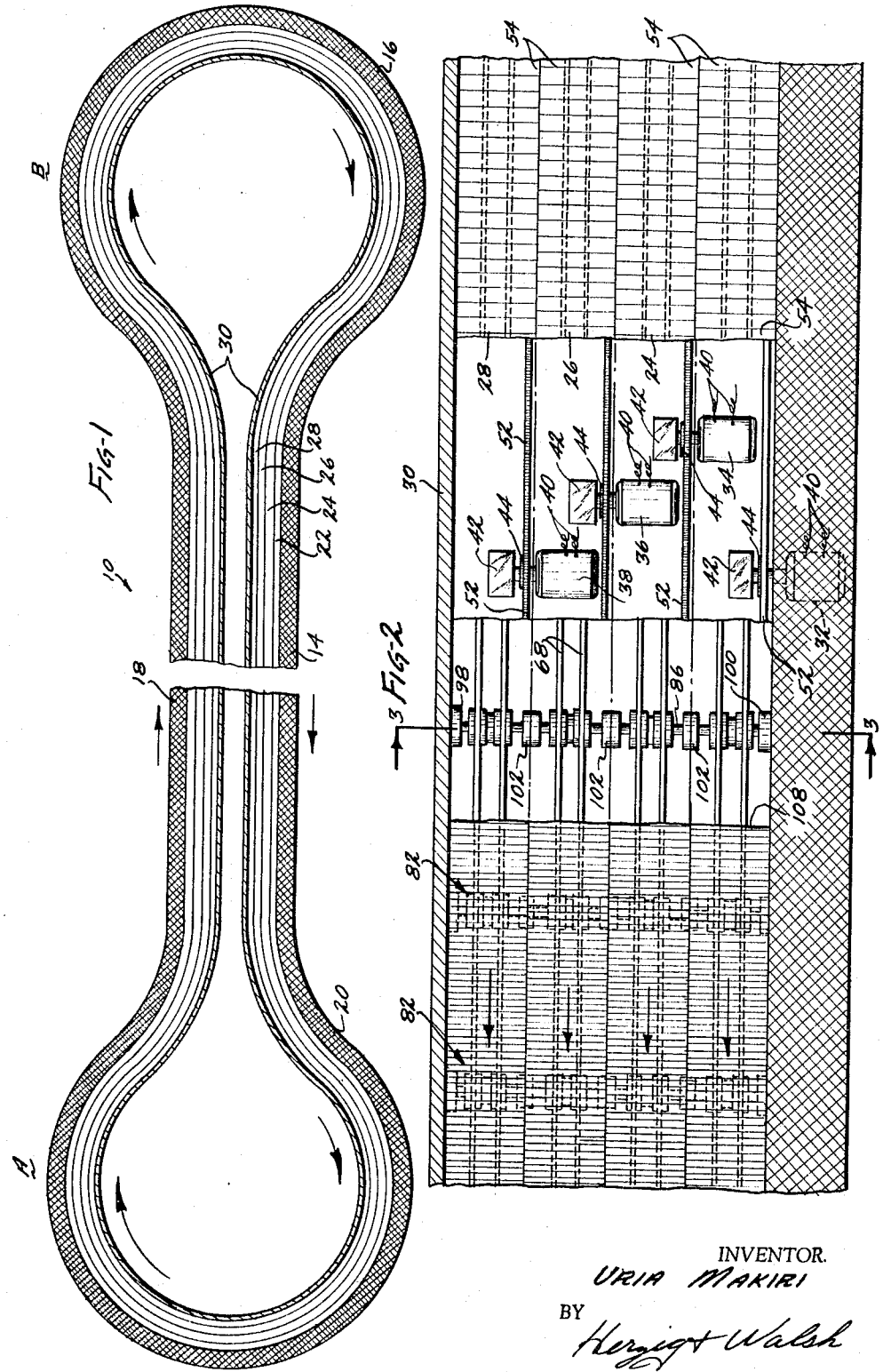
INVENTOR.
URIA MAKIRI
BY
Herzig & Walsh
ATTORNEYS Aug. 9, 1966 U. MAKIRI 3,265,010
MASS TRANSPORTATION SYSTEM
Filed March 25, 1964 2 Sheets-Sheet 2
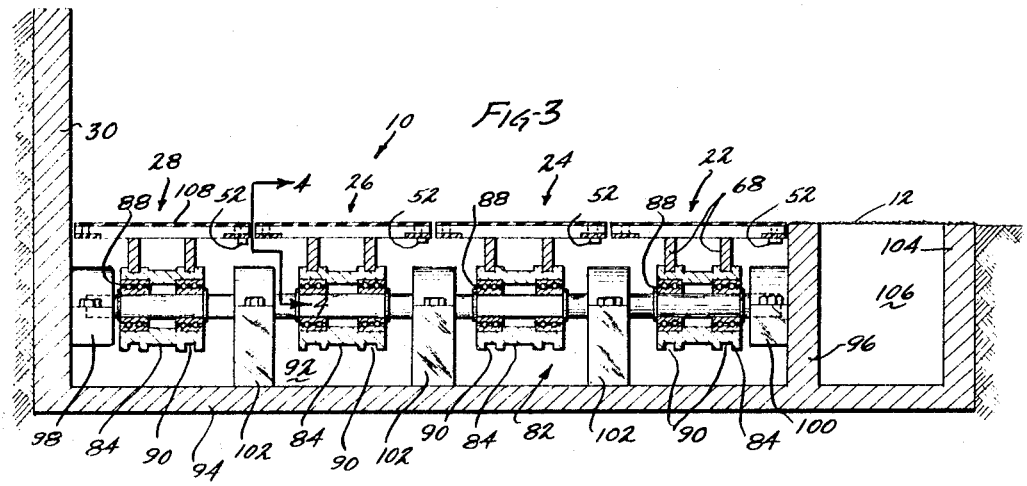
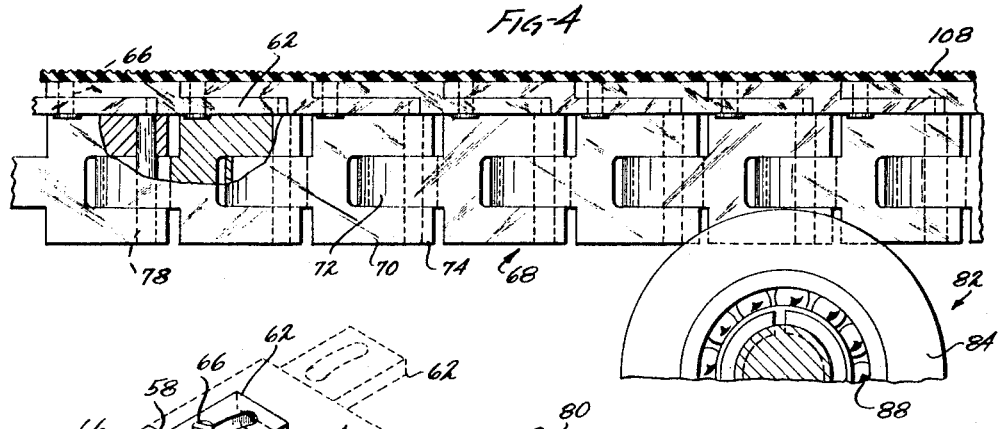
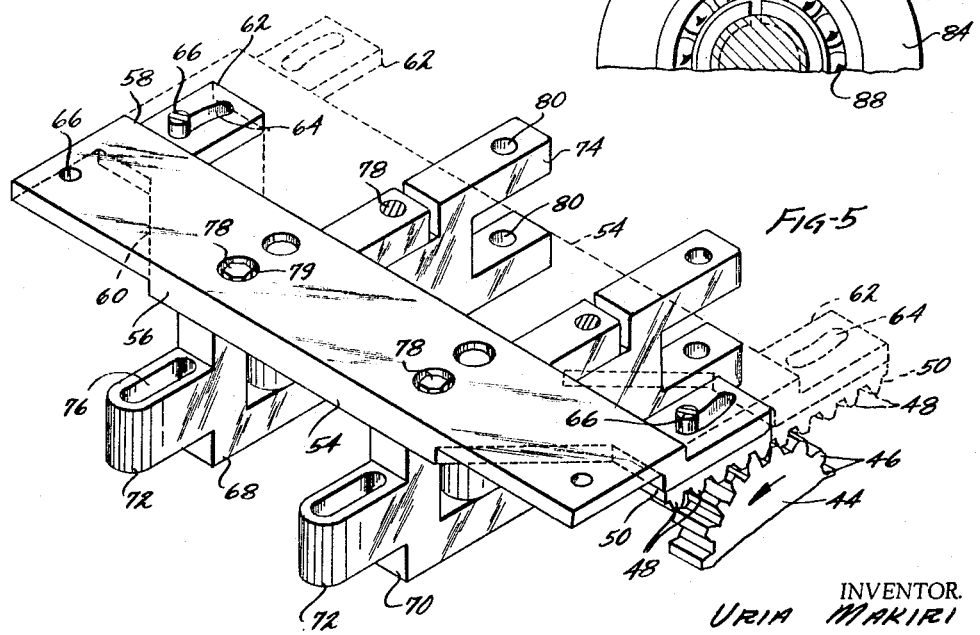
INVENTOR.
URIA MAKIRI
BY Herzig & Walsh
ATTORNEYS

United States Patent Office 3,265,010
Patented August 9, 1966

3,265,010
MASS TRANSPORTATION SYSTEM
Uria Makiri, 6137½ Saturn St., Los Angeles, Calif.
Filed Mar. 25, 1964, Ser. No. 354,656
3 Claims. (Cl. 104—25)

This invention relates to a mass transportation system and more particularly to a system employing a plurality of endless, constantly moving conveyors which operate at relatively different speeds so that passengers may progress from a stationary platform through relatively slower moving conveyors to a main conveyor which is operating at sufficient speed to move the passengers safely, efficiently and expeditiously from an outlying district to a downtown area.

The use of automobiles on multiple lane freeways has become quite a problem. It is not only quite expensive and inefficient for a mass of individuals to each commute from an outlying area to a downtown area in separate automobiles, but is becoming increasingly more dangerous due to overcrowded freeways. Also, many metropolitan areas place considerable blame on automobile exhaust gases for the ever increasing air pollution menace. In addition, it has become increasingly hazardous to enter a freeway during rush hours because of the difficulty of merging into the fast moving stream of closely spaced automobiles. Also, it is sometimes virtually impossible to accomplish the necessary lane changes to get over to an off-ramp for the purpose of leaving a freeway.

Other forms of mass transportation such as railways and buses also have certain disadvantages. The major disadvantage resides in the fact that loading and unloading stations are all too few and quite often there is a considerable waiting period for the next bus or train.

Another disadvantage with commuting by bus or train resides in the fact that the facilities are so crowded at rush hours that the passengers ride in considerable discomfort.

Although various types of continuously moving mass transportation systems have been proposed, including some systems which operate with a plurality of trains moving at relatively different speeds, such systems usually have the disadvantage that all passengers using the system are loaded onto the system at one point and discharged at another point. During rush hours it is virtually impossible to board the system without waiting in line an unduly long length of time. Also, there is danger of being jostled about by fellow passengers trying to board the system at one place at the same time.

In view of the foregoing factors and conditions characteristic of mass transportation systems, it is a primary object of the present invention to provide a new and improved mass transportation system not subject to the disadvantages enumerated above and having a plurality of parallel, continuously moving conveyors operating at progressively different speeds which may be boarded at any point along the system safely, efficiently and expeditiously.

Another object of the present invention is to provide a mass transportation system which employs a plurality of parallel, conveyor runs operating at one initially safe and appropriate boarding speed and increasing at corresponding or progressively greater boarding or transfer speeds in respectively adjacent conveyor means as, for example, 5, 10, 15, 20, 25, 30, etc. miles per hour, whereby a pedestrian can step onto the slowest conveyor and then step onto conveyors moving at progressively greater speeds, selecting the conveyor desired. This can be advantageously duplicated on both sides so that the center lane is fastest, or one side lane can be the fastest.

A further object of the present invention is to provide removable platform segments for an endless passenger conveyor.

Yet another object is to provide an improved, linked, endless track for an endless passenger conveyor.

According to the present invention, a mass transportation system is provided, as between an outlying area and a downtown area, within a metropolitan area, between cities, or even interstate, which comprises a plurality of parallel, continuously moving conveyors adjacent each other. A stationary platform or sidewalk is provided adjacent the slowest conveyor and encompasses the entire conveyor system so that a pedestrian can have access to the transportation system at any point between the outlying area and the downtown area on both the inbound and the outbound sides of the system.

The individual conveyor runs have flush upper surfaces which minimize the tripping hazard when a pedestrian steps from one conveyor to another. Each conveyor includes a plurality of removable transverse platforms which are connected together with linked track means having expansion joints permitting relative movement between the platform segments when the conveyor negotiates the turns at the ends of the system. Long, gradual curves are provided at the ends of the system so that relative movement between adjacent platform segments is minimized. A continuous sheet of resilient, flexible material is provided on top of the platform sections to cover the space that opens between the sections when curves are being negotiated.

Each conveyor is driven by a plurality of electric motors which may be spaced at suitable intervals along the conveyor. Each motor drives a pinion which engages a rack mounted along the edge of the conveyor being driven by the motor. Each rack includes sections corresponding in length to the width of the transverse platform segments.

The rails which support the transverse platform segments for each conveyor form continuous loops between the outlying area and the downtown area. The rails are supported by grooved rollers.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a diagrammatic view of a mass transportation system of the present invention showing a series of continuous conveyors having parallel runs adapted to be operated at different speeds with respect to each other;

FIGURE 2 is a plan view of a portion of the system of FIGURE 1, on an enlarged scale, with portions broken away to show internal construction;

FIGURE 3 is a cross-sectional view, on an enlarged scale, taken along line 3—3 of FIGURE 2;

FIGURE 4 is a partial, cross-sectional view, on an enlarged scale, along line 4—4 of FIGURE 3; and FIGURE 5 is an enlarged perspective view showing details of construction of platform and rail segments of an individual conveyor.

Referring again to the drawings, a mass transportation system constituting a presently preferred embodiment of the invention, generally designated 10, includes a continuous platform or sidewalk 12 which extends in a continuous loop from an outlying area A to a downtown area B and back again. The sidewalk 12 includes an inbound section 14, a first circular section 16, forming a closed loop in the downtown area B, an outbound section 18 and a second circular section 20 forming a closed loop in the outlying area A. The sidewalk 12 encompasses a system of conveyors comprising a low speed or boarding conveyor 22, a first intermediate or transitional conveyor 24, a second intermediate or transitional conveyor 26 and a high speed conveyor 28. The low speed conveyor 22 is adjacent the sidewalk 12 and is flush with the upper surface thereof so that a pedestrian can step from the sidewalk 12 onto the conveyor 22 with a minimum of effort.

An upstanding wall 30 is provided adjacent the high speed conveyor 28 to prevent pedestrians from leaving the transportation system 10 without first transferring to the progressively slower intermediate conveyors 26 and 24 and then onto the low speed conveyor 22.

While a number of different comparative speeds for the conveyors 22, 24, 26 and 28 will manifest themselves (or any additional numbers of conveyors for the purpose of gradual, safe increase of speed so that the pedestrian can safely board from a stationary platform 12 onto first conveyor and continue to board from one conveyor to another with the same safety until reaching the conveyor of maximum speed where comfortable seating facilities would be available), one suggested arrangement is to drive the conveyor 22 at 5 miles per hour, the conveyor 24 at 10 miles per hour, the conveyor 26 at 15 miles per hour, and the conveyor 28 at 20 miles per hour, and so to any number of conveyors, each one increasing in speed by 5 miles per hour. With this arrangement, a pedestrian desiring to board the transportation system 10 at any point between the outlying area A and the downtown area B can do so by simply walking from the sidewalk 12 onto the low speed conveyor 22. Should the pedestrian find the 5 mile per hour speed too slow, he can safely and easily step onto the first intermediate conveyor 24 which is traveling at 10 miles per hour. Should this speed also be too slow to suit the needs of the pedestrian, he can progressively move to the next intermediate conveyor and then onto the higher speed conveyor 28 which will transport him at 20 miles per hour, and so on to any number of conveyors, their speed increasing 5 miles per hour from one to another. As a pedestrian riding on the conveyor at the desired speed nears his destination, he simply moves progressively through the intermediate conveyors to the low speed conveyor 22 from which he can step onto the sidewalk 12 with ease.

Each of the conveyors is driven by a plurality of motors, such as the ones shown at 32, 34, 36 and 38 for the conveyors 22, 24, 26 and 28, respectively. The group of motors for a particular conveyor may be spaced at suitable intervals, such as 100 yards, along the path traveled by the associated conveyor. The motors only require enough power to keep the system in motion since forces due to inertia from starting and stopping are substantially eliminated. Each motor includes a pair of electrical leads 40 for connecting it to a source of power, not shown, and is connected to a gear box 42. Each gear box 42 drives a gear 44 having teeth 46 (FIGURE 5) which engage teeth 48 on rack sections 50. The individual rack sections 50 form a continuous rack 52 which is attached to the under side of an associated conveyor 22, 24, 26 or 28 for driving the conveyor continuously through an associated gear 44. The gears 44 may be driven in a counterclockwise direction, as viewed in FIGURE 5, so that the force exerted on the individual rack sections 50 will move them in a direction tending to maintain them in abutting relationship.

Each conveyor includes a plurality of transverse platform sections or segments, two of which are shown in perspective at 54 in FIGURE 5. Each platform 54 has a leading edge 56 and a trailing edge 58. A recess 60 is formed in the ends of each platform segment 54 adjacent the leading edge 56 and a tongue 62 is provided adjacent the trailing edge 58 at each end of the segment 54. Each tongue 62 includes an arcuate slot 64 which is engageable by a pin 66 carried on the under side of an adjacent platform 54 in its associated cavity 60. The pins 66 coact with the slots 64 to permit relative movement between adjacent platform sections 54 while also maintaining them in connected relationship to facilitate negotiating the closed loops at the ends of the transportation system 10.

The several platforms 54 are affixed to a pair of parallel rails 68 which are provided for each of the conveyors 22, 24, 26 and 28. Each rail 68 comprises a plurality of individual links 70 each of which includes a tongue portion 72 and a bifurcated portion 74. An elongated slot 76 is provided in each tongue 74 and is engageable by a pin 78 passing through apertures 79 and 80 provided in the segments 54 and the bifurcated portions 74, respectively. The slot 76 permits relative movement between the individual links 70 to impart flexibility to the track 68 facilitating the negotiation of the closed loops at the ends of the transportation system. The individual platform segments 54 and the links 70 may be readily removed by simply removing an associated pin 78.

Referring now in particular to FIGURE 3, the several rails 68 are supported by a system of roller assemblies 82 including a plurality of rollers 84 which are rotatably mounted on bearing 88. Each roller 84 includes a pair of grooves 90 which are engaged by their associated rails 68. A plurality of assemblies 82 are mounted on suitable centers within a passageway 92 formed by the wall 30, a bottom wall 94 and a sidewall 96. Each shaft 86 is non-rotatably supported between the walls 30 and 96 by pillow blocks 98 and 100 rigidly affixed to the walls 30 and 96, respectively. The shafts 86 also derive support from the bottom wall 94 through pillow blocks 102.

The sidewalk 12, which may be made of a suitable wire mesh, is supported by the wall 96 and a spaced, parallel wall 104 forming a passageway 106 with the bottom wall 94.

The upper surface of each conveyor is covered with a flexible, continuous covering 108 providing a non-slip surface for the passengers and covering the cracks between the individual transverse platform segments 54. The covering 108 has sufficient flexibility to permit a limited amount of stretching as the platform segments 54 move relative to one another as their associated conveyors negotiate the closed loops at the ends of the transportation system. Alternatively, adjacent pairs of the segments 54 can be covered with chamfered, sliding plates, not shown, which then can be covered individually with a flexible covering.

Additionally, the system may be constructed so as to be enclosed on all sides to eliminate exposure to uncomfortable weather conditions and the high-speed conveyor may be equipped with compartments for freight which could be rolled on and locked into the compartment with a sign indicating to workmen that it is to be taken off at a particular station. Also, an extension may connect the high-speed conveyor to a similar transportation system leading to another city. By stepping from conveyor to conveyor, a person can reach a speed of 65 miles per hour more quickly than he can accelerate to this speed in an automobile.

While the particular high-speed transportation system herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A mass transportation system for moving pedestrians from an outlying area to a downtown area, comprising: a plurality of parallel, adjacent endless conveyors forming a closed loop between said outlying area and said downtown area; driving means connected to said conveyors for driving them continuously at progressively increasing speeds from one conveyor to the next, a stationary platform encompassing said conveyors, whereby pedestrians have access to said conveyors at any point between said outlying area and said downtown area, said plurality of conveyors including a first conveyor immediately adjacent said platform, a second conveyor adjacent said first conveyor, a third conveyor adjacent said second conveyor, and a fourth conveyor adjacent said third conveyor, the upper surfaces of said platform and said conveyors being at the same relative elevation and wherein said means for driving said conveyors includes first means for driving said first conveyor at approximately 5 miles per hour, second means for driving said second conveyor at approximately 10 miles per hour, third means for driving said third conveyor at approximately 15 miles per hour and fourth means for driving said fourth conveyor at approximately 20 miles per hour, an upstanding wall adjacent said fourth conveyor, each conveyor comprising a plurality of links connected together to form an endless track, each link including a tongue portion and a bifurcated portion, the bifurcated portion of one link slidably engaging the tongue portion of an adjacent link, each of said tongue portions including an elongated slot and each of said bifurcated portions including an aperture, platform sections mounted transversely across each of said links, a pin connecting each platform section to associated link sections, each of said pins passing through a platform section, an associated aperture and an associated elongated slot, and roller means rotatably mounted adjacent each conveyor, said roller means including grooves engageable by said tracks.

2. The transportation system of claim 1 wherein each of said conveyors includes a flexible pad covering said platform sections.

3. The transportation system of claim 2 wherein said driving means includes a rack segment affixed to each platform section and a driving gear in driving engagement with said rack segments, the rack segment of one platform section being aligned with the rack segment of an adjacent platform section, whereby a continuous rack is formed.

References Cited by the Examiner

UNITED STATES PATENTS

| | | | |
|---|---|---|---|
| 421,186 | 2/1890 | Munden | 198—195 X |
| 1,054,943 | 3/1913 | Schmidt | 198—76 X |
| 1,615,453 | 1/1927 | Hencken | 104—25 |
| 2,604,971 | 7/1952 | Snyder | 198—76 X |

EVON C. BLUNK, *Primary Examiner.*

EDWARD A. SROKA, SAMUEL F. COLEMAN,
*Examiners.*